United States Patent [19]
Chen

[11] Patent Number: 6,132,897
[45] Date of Patent: Oct. 17, 2000

[54] CELLULAR PHONE BATTERY WITH FLUORESCENT AGENT INDICATING ILLUMINATOR

[76] Inventor: Chin-Yu Chen, 1F, No. 20, Lane 54, Chien-Kuo St., Panchiao City, Taipei, Taiwan

[21] Appl. No.: 09/132,741

[22] Filed: Aug. 12, 1998

[51] Int. Cl.⁷ .................................................. H01M 10/48
[52] U.S. Cl. ................................................ 429/90; 429/61
[58] Field of Search .................................... 429/90, 61

Primary Examiner—John S. Maples
Attorney, Agent, or Firm—Dougherty & Troxell

[57] ABSTRACT

A cellular phone battery with fluorescent agent indicating illuminator. An ultraviolet ray emitter is disposed on a suitable portion of the battery body. The bipolar electrodes of the ultraviolet ray emitter are controllably electrically connected with the bipolar electrodes of the battery body so as to radiate ultraviolet ray. Therefore, when using the cellular phone battery, the ultraviolet ray emitter serves to radiate ultraviolet ray for indicating fluorescent agent. Also, the ultraviolet ray emitter can be activated to exhaust the remaining electricity of the battery so as to avoid memory obstacle of the charging of the battery.

7 Claims, 2 Drawing Sheets

1

CELLULAR PHONE BATTERY WITH FLUORESCENT AGENT INDICATING ILLUMINATOR

BACKGROUND OF THE INVENTION

The present invention relates to a cellular phone battery with fluorescent agent indicating illuminator. An ultraviolet ray emitter is disposed on a suitable portion of the battery body. The bipolar electrodes of the ultraviolet ray emitter are controllably electrically connected with the bipolar electrodes of the battery body so as to radiate ultraviolet ray. When using the cellular phone battery, the ultraviolet ray emitter serves to radiate ultraviolet ray for indicating fluorescent agent.

It is known that a cellular phone battery can be repeatedly charged to provide power for the cellular phone. In fact, such battery alternatively can provide power for other portable electrical appliances which is generally powered by minitype cells. Accordingly, the consumption of the cells can be reduced and this is helpful to environmental protection.

It is known that fluorescent agent is widely applied to various kinds commercial products, especially to the clothes detergent. The fluorescent agent remaining on the clothes or the fluorescent picture printed on articles can be clearly seen by means of the radiation of an ultraviolet lamp. Another example of application of the fluorescent agent is the identification of a true bill from a fake one. The true bill is made of multiple laminated layers of paper sheets in which an internal layer is printed with fluorescent picture or mark. When radiated by an ultraviolet lamp, a fluorescent picture is shown in the bill. A fake bill cannot show such picture. Therefore, an ultraviolet lamp can be used to identify a true bill.

Moreover, the existing cellular phone battery has a shortcoming that the electricity is often no exhausted and is accumulated in the battery as a memory obstacle. This reduces the electricity storage ability of the battery. In order to solve this problem, the battery must be totally discharged prior to charging. The battery itself cannot release the electricity and the remaining electricity must be exhausted by a charger. This is time-consuming and quite inconvenient.

SUMMARY OF THE INVENTION

It is a primary object of the present invention to provide a cellular phone battery with fluorescent agent indicating illuminator. An ultraviolet ray emitter is disposed on a suitable portion of the battery body and powered by the battery without using any cell. When using the cellular phone battery, the ultraviolet ray emitter serves to radiate ultraviolet ray for indicating fluorescent agent or picture on an article.

It is a further object of the present invention to provide the above cellular phone battery in which the ultraviolet ray emitter is extendible and flexible for use in different sites and radiating ultraviolet ray by different angles.

It is still a further object of the present invention to provide the above cellular phone battery in which the ultraviolet ray emitter can be activated to exhaust the remaining electricity of the battery without using any measure for discharging the electricity so as to shorten the charging time and avoid memory obstacle of the charging of the battery. Also, by means of observation of the brightness of the ultraviolet ray emitter, the amount of the remaining electricity can be easily known.

The present invention can best understood through the following description and accompanying drawings, wherein:

DETAILED DESCRIPTION OF THE PREFERRED EMBODIMENT

Figure 1:
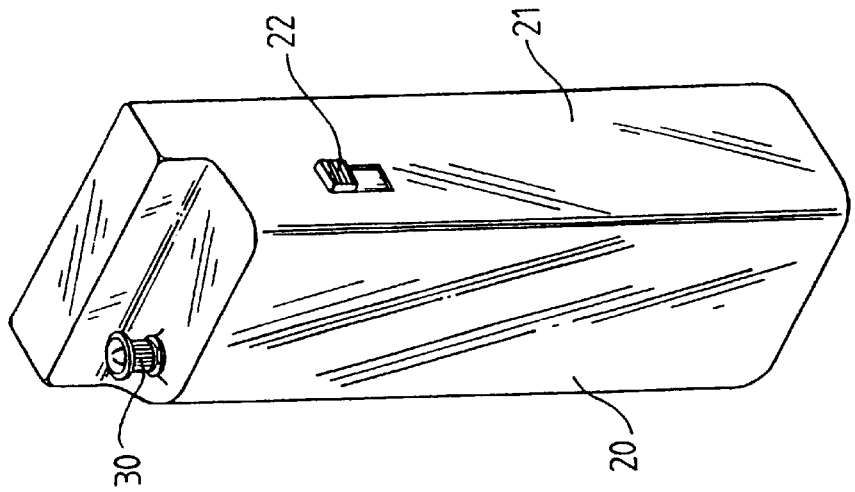
FIG. 1 is a perspective view o an embodiment of the present invention.
Figure 3:
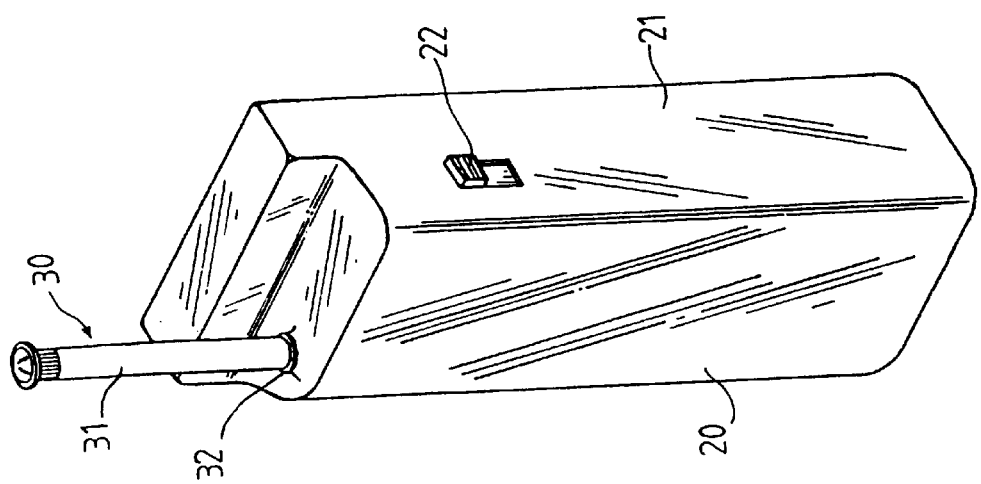
FIG. 3 is a perspective view of another embodiment of the present invention.
Figure 2:
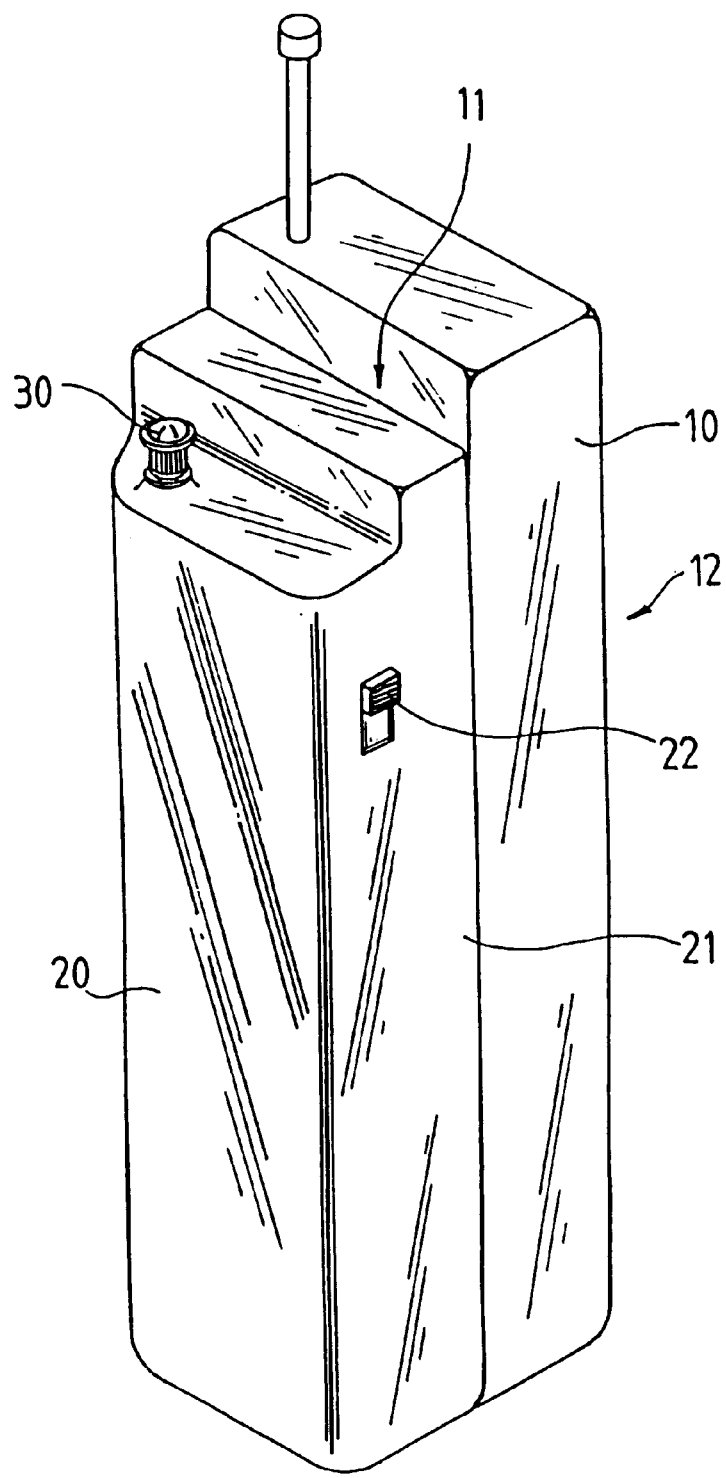
FIG. 2 shows that the battery of the present invention is engaged with a cellular phone.

Please refer to FIGS. 1 and 2. The present invention includes a battery body 20 which can be engaged with a battery seat 11 of a cellular phone 10. At least one ultraviolet ray emitter 30 (such as an ultraviolet lamp) is disposed on a lateral wall 21 of the battery body 20. The bipolar electrodes of the ultraviolet ray emitter 30 are electrically connected with the bipolar electrodes of the battery body 20. The controlling of the bipolar electrodes of the ultraviolet ray emitter 30 is achieved by a power switch 22 disposed on the housing of the battery body 20. Alternatively, the ultraviolet ray emitter 30 is disposed with a drawing portion 31, whereby when the drawing portion is drawn to a position 2 and the emitter 30 is drawn out, the bipolar electrodes of the battery body 20 are triggered and powered on. At this time, the ultraviolet ray emitter 30 produces a fluorescent effect. Accordingly, the battery body 20 not only provides power for the cellular phone 10 but also is able to indicate the fluorescent agent and pictures. The battery of the cellular phone can be repeatedly charged to also provide power for the ultraviolet ray emitter so as to reduce the number of the consumed disposable cells to meet the requirement of environmental protection. Moreover, the ultraviolet ray emitter can be activated to exhaust the remaining electricity of the battery so as to avoid memory obstacle of the charging of the battery. Furthermore, by means of observation of the brightness of the ultraviolet ray emitter 30, the amount of the remaining electricity can be easily known.

It should be noted that the above description and accompanying drawings are only used to illustrate some embodiments of the present invention, but intended to limit the scope thereof. Any modification of the embodiments should fall within the scope of the present invention.

What is claimed is:

1. A cellular phone battery for a cellular phone with a fluorescent agent indicating illuminator, the battery having a body adapted to be engaged with the cellular phone, said battery comprising at least one ultraviolet ray emitter disposed on a lateral wall of the body, the ultraviolet ray emitter being electrically connected with the battery and controlled by a controlling device whereby the ultraviolet ray emitter serves to radiate ultraviolet ray to indicate a fluorescent agent.

2. The cellular phone battery as claimed in claim 1, wherein the ultraviolet ray emitter has a drawing portion received in the battery body, which can be drawn out from the battery body a predetermined length.

3. The cellular phone battery as claimed in claim 2, wherein the drawing portion also comprises the controlling device such that when the drawing portion is drawn out to a maximum extent, the ultraviolet ray emitter is turned on.

4. The cellular phone battery as claimed in claim 2, wherein the drawing portion is flexible.

5. The cellular phone battery as claimed in claim 3, wherein the drawing portion is flexible.

6. The cellular phone battery as claim in claim 1, wherein the controlling device comprises a power switch disposed on the battery body for controlling the ultraviolet ray emitter.

7. The cellular phone battery as claim in claim 2, wherein the controlling device comprises a power switch disposed on the battery body for controlling the ultraviolet ray emitter.

* * * * *